Feb. 27, 1923. 1,447,108.
W. W. VOSBURGH.
RIM MOUNTING.
FILED DEC. 23, 1920.
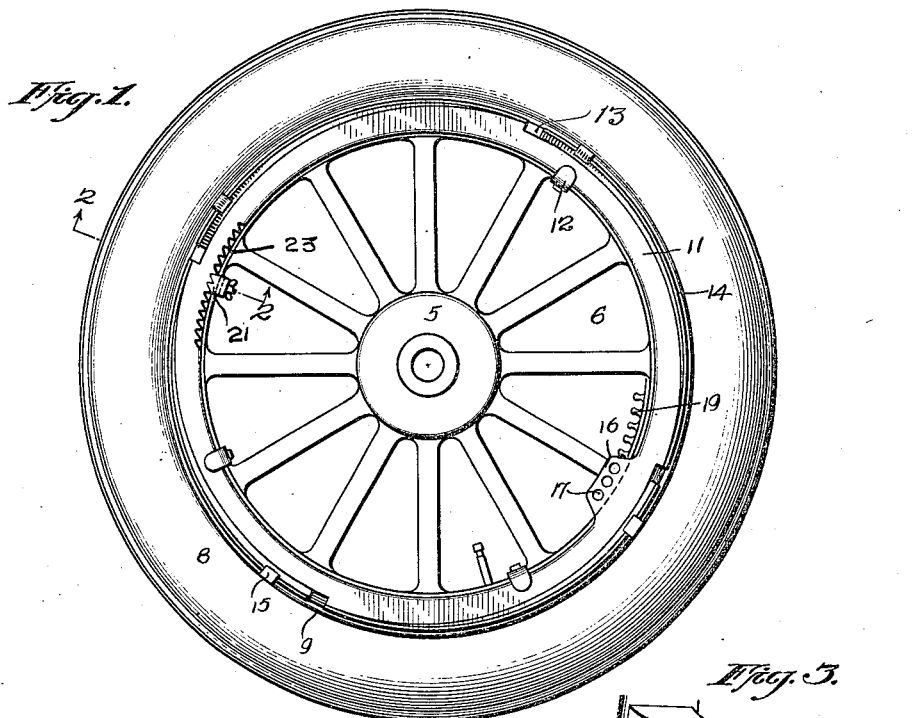
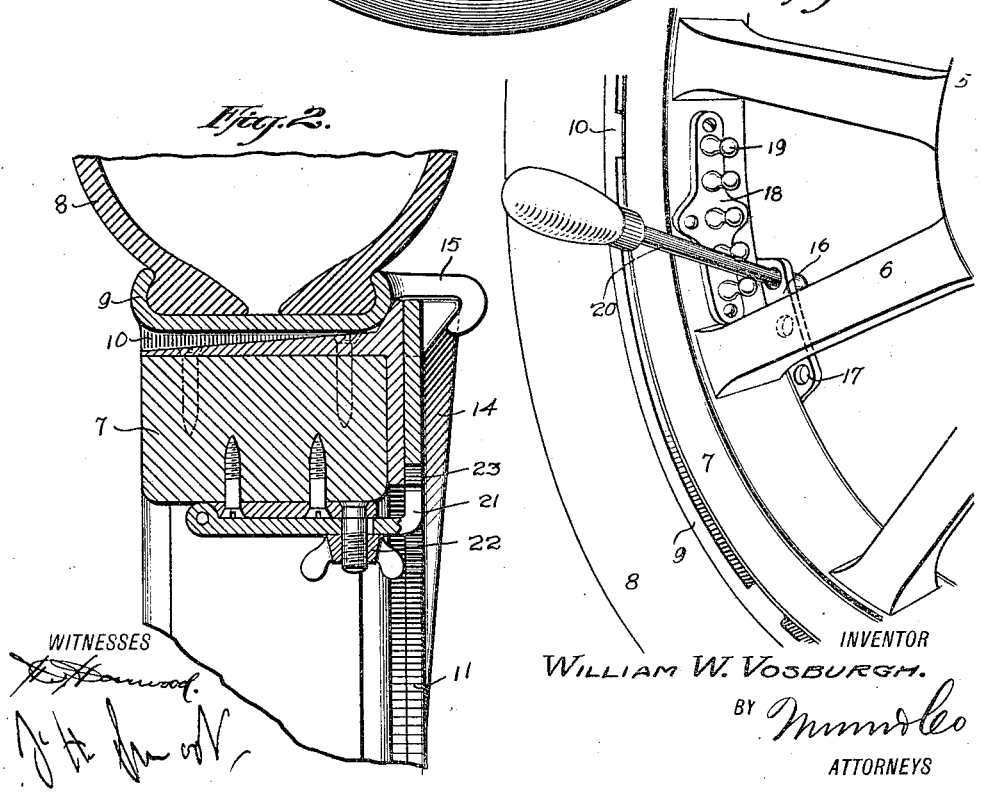
WITNESSES
INVENTOR
WILLIAM W. VOSBURGH.
BY
ATTORNEYS Patented Feb. 27, 1923.

1,447,108

UNITED STATES PATENT OFFICE.

WILLIAM WOOSTER VOSBURGH, OF TROY, NEW YORK.

RIM MOUNTING.

Application filed December 23, 1920. Serial No. 432,730.

*To all whom it may concern:*

Be it known that I, WILLIAM W. VOSBURGH, a citizen of the United States, and resident of Troy, in the county of Rensselaer and State of New York, have invented a new and Improved Rim Mounting, of which the following is a full, clear, and exact description.

My invention relates to a rim mounting, and aims to provide a device of this character, by means of which a rim may be associated with and detached from the felly of a wheel with a maximum of ease.

It is well appreciated, in connection with automotive and other vehicles employing pneumatic tires, that it has been customary to provide a rim of any desirable character, which was of a diameter sufficient to permit of its being slipped upon the felly of a wheel, thus providing what was known as a demountable rim, the advantages of which are well known.

However, to secure this rim in its proper position, it has been necessary to resort to the use of what is commonly known as rim lugs, which have engaged screw threaded bolts associated with the felly, and they served to clamp the rim in its proper position, at the same time commonly exerting a wedge action for serving to fill in the space existent between the outer edge of the rim and felly.

With a view of providing maximum security, and reducing the strain upon each of the lugs, it has been customary to utilize quite a number of the same. Particularly where a rim has been in position for any length of time, great difficulty is experienced in "starting" these lugs, as they become "frozen" upon the bolts.

This difficulty is multiplied incident to the number of lugs utilized, and aside from this objection, it is commonly found that these lugs are rusted and usually covered with a layer of mud, dust, etc., which will soil the hands and clothes of the operator, upon a rim being removed.

Aside from this, objection is to be found in that the lugs quite often become lost, and no additional lugs are available at that time, thus upon the rim being applied, a great amount of strain is exerted upon those bolts to which lugs are applied, as well as to the rim, wheel and tire, incident to the play which will come into being due to this insecure method of applying the rim.

Having the foregoing defects in mind I have now provided a rim mounting which shall primarily permit of the association of a rim with a felly of a wheel in such a manner that all play and squeaks, as well as uneven strain upon the parts will be avoided.

A further object of my invention is the provision of a device of this character, by means of which the rim may be detached and applied with a maximum of ease, aside from the fact that it will not permit of the parts becoming "frozen."

A still further object of my invention is the provision of a device of the character specified, by means of which a single manipulation of the parts will serve to achieve the result desired, so that it will not be necessary for the operator to manipulate and handle numerous duplicated parts a number of times, resulting in the soiling of the hands and clothes.

Further objects of my invention will appear in the annexed specification and drawings, which latter present one practical embodiment of my invention, and in which—

Figure 1 is a side elevation of a rim mounting embodying my invention.

Figure 2 is an enlarged sectional view taken along the line 2—2 of Figure 1, in the direction of the arrow, and Figure 3 is a fragmentary perspective view illustrating one of the details of my invention.

In these views the reference numeral 5 indicates the hub, 6 the spokes, and 7 the felly of any desired type of wheel, to which the tire 8, mounted upon a rim 9, also of any desired character is to be applied.

Primarily, it will be noted that contrary to the conventional construction, the inner face of the rim 9 is conveniently provided with a series of wedge-shaped lugs 10, which are preferably integral with the rim and serve to compensate for the space provided by the beveling of the face of the felly band, which is an expedient commonly resorted to. Thus upon the rim being properly positioned upon the felly a bearing surface will be provided throughout the entire width thereof, contrary to the conventional construction, which provides a support adjacent the inner edge of the rim by this portion contacting with the felly band, and at certain parts adjacent the outer edge of the rim, at which points the lugs are interposed between the rim and felly.

Also, contrary to the usual construction, a ring 11 is movably attached as at 12, to the felly 7, and rotatable in a plane parallel with respect thereto. It will also be noted that this ring includes a series of cut out portions 13 of any desired number, and in its outer edge, and is also provided with a number of wedge-shaped shoulders 14 having their inner ends, i. e., the point at which they are of least width, adjacent one of the cutout portions 13, and terminating at their point of maximum width substantially adjacent the next cut out portion.

In this connection, it is to be noted that the shoulders 14 are of a number corresponding to the number of cut out portions provided, and that each of these shoulders extends in the same direction as the shoulders formed adjacent to it.

It will now be seen, reference being had to Figure 2, that the rim 9 has secured to it, adjacent the inner edge, a plurality of hooks 15 which also correspond to the number of cutout portions 13 provided, and have their inner ends lying in a plane corresponding to that occupied by the shoulders 14 of the ring 11. Thus the ring may be rotated in a manner hereinafter more fully specified, to a point at which the guides will lie adjacent the cutout portion 13. The rim may now be properly positioned upon the felly by moving the same inwardly therefrom, and it will be found that the hooks 15 will move through the cutout portion 13.

Now with a view of providing means serving to properly move the ring 11, it will be seen that any suitable medium may be utilized as for instance, that illustrated in Figure 3.

In this view it will be noted that the ring 11 is provided with an inwardly extending shoulder portion 16 formed with a series of openings 17, and the felly 7 mounts a plate 18 provided with a series of studs 19.

Obviously upon a lever 20 of any desired character being utilized in the manner indicated, it will be seen that the studs 19 will act as a fulcrum, the outer end of the lever serving to move the ring 11 in a positive manner. Thus the ring 11 may be rotated by hand subsequent to the application of the rim in the manner specified, until the shoulders 14 engage the hooks 15.

With a view of forcing the ring to its proper position at which all of the parts will be securely held, the lever 20 may be utilized, and it will be seen that this element will serve to force the ring to its proper position illustrated in Figures 1 and 2, as well as serving to support the ring upon the rim being removed.

Also with a view of providing suitable means serving to prevent any accidental movement on the part of the ring upon its having been once moved, to its proper position, I conveniently utilize a pawl 21 which may be operated in any suitable manner, as by means of a thumb screw 22, to effect positive engagement with a ratchet 23 forming a part of the inner edge of the ring 11. Thus upon this ring having been moved to its proper position and the ratchet or other means employed to engage the same having been properly applied, any accidental loosening on the part of the ring will be prevented.

From the foregoing it will be appreciated that I have constructed a rim mounting by means of which all of the objections set forth in the preamble are avoided, as well as the benefits also set forth will be received.

Obviously numerous modifications of structure might readily be resorted to without in the least departing from the spirit of my invention, which I claim as—

1. A rim mounting including a felly band, a ring provided with inclined shoulders at one side of said band, a rim, hook members secured to said rim, said members being adapted to co-operate with said inclined shoulders, means for moving said ring with respect to said felly band whereby to force said hook members into intimate engagement with said shoulders, a pawl, means for mounting said pawl, and a ratchet formed on said ring whereby to lock the rim with respect to the latter.

2. A rim mounting including a felly band, a ring formed with inclined shoulders arranged at one side of said band, a rim, hooks secured to said rim, said hooks being adapted to co-operate with said shoulders, a series of studs, means for mounting said studs, and a shoulder also forming a part of said band, said last-mentioned shoulder being adapted to project to a point adjacent said studs and being formed with a series of openings.

3. The combination with a wheel having a beveled felly provided with an up-standing flange adjacent to its inner edge, a removable rim having a felly engaging face provided with a plurality of transverse wedges, a plurality of hooks carried by the rim and extending over and beyond the flange of the felly, a removable ring provided with a plurality of openings adjacent to its periphery, said openings designed to register with said hooks, a plurality of arcuate wedges disposed concentrically on the ring between the openings, cooperating means carried by the ring, and the felly, whereby the ring may be rotated with respect to the felly, said hooks engaging the arcuate wedges of the ring, said wedges functioning under continued rotation of the ring to draw the rim tightly against the flange and the wedges of the rim against the beveled face of the felly, and means for retaining the ring in said position.

WILLIAM WOOSTER VOSBURGH.